(12) United States Patent
Pokupec

(10) Patent No.: US 8,235,405 B1
(45) Date of Patent: Aug. 7, 2012

(54) LINKAGE FOR A VEHICLE SUSPENSION

(75) Inventor: Douglas Pokupec, Burlington (CA)

(73) Assignee: Douglas Pokupec, Burlington (CA)

( * ) Notice: Subject to any disclaimer, the term of this patent is extended or adjusted under 35 U.S.C. 154(b) by 0 days.

(21) Appl. No.: 13/066,627

(22) Filed: Apr. 21, 2011

Related U.S. Application Data

(63) Continuation-in-part of application No. 12/217,253, filed on Jul. 3, 2008, now Pat. No. 7,954,834.

(51) Int. Cl.
*B60G 3/04* (2006.01)

(52) U.S. Cl. ....... 280/124.134; 280/124.1; 280/124.128; 280/124.133; 280/124.153; 16/354

(58) Field of Classification Search ............... 280/124.1, 280/124.128, 124.133, 124.134, 124.153; 16/354
See application file for complete search history.

(56) References Cited

U.S. PATENT DOCUMENTS

| | | | | |
|---|---|---|---|---|
| 1,290,293 A * | 1/1919 | Morski | | 267/250 |
| 1,397,922 A * | 11/1921 | Cornelison | | 280/124.153 |
| 1,989,837 A * | 2/1935 | Walters | | 180/361 |
| 2,024,199 A * | 12/1935 | Barnes et al. | | 180/357 |
| 2,836,014 A * | 5/1958 | Calderwood | | 451/137 |
| 5,269,048 A * | 12/1993 | Pazmany | | 16/354 |
| 6,142,495 A * | 11/2000 | Kim | | 280/124.111 |
| 6,926,363 B2 * | 8/2005 | Yamashita | | 297/366 |
| 7,392,998 B2 * | 7/2008 | Runkel | | 280/124.157 |
| 7,617,569 B2 * | 11/2009 | Liao | | 16/334 |
| 7,954,834 B2 * | 6/2011 | Pokupec | | 280/124.134 |
| 2003/0177607 A1 * | 9/2003 | Pelletier | | 16/354 |
| 2006/0208446 A1 * | 9/2006 | Runkel | | 280/124.128 |
| 2008/0168623 A1 * | 7/2008 | Brouwer et al. | | 16/354 |
| 2008/0277894 A1 * | 11/2008 | Runkel | | 280/124.128 |
| 2009/0044377 A1 * | 2/2009 | Liang et al. | | 16/354 |
| 2009/0241290 A1 * | 10/2009 | Jones et al. | | 16/291 |
| 2011/0271486 A1 * | 11/2011 | Wang et al. | | 16/319 |

* cited by examiner

*Primary Examiner* — Faye M Fleming
*Assistant Examiner* — Barry Gooden, Jr.

(57) ABSTRACT

A linkage for connecting a frame of a vehicle to an unsprung mass component of the vehicle, includes:
a first portion connectable to the frame, the first portion includes a first toothed surface and a fourth rotatable connection;
a second portion connectable to the unsprung mass component, the second portion includes a second toothed surface and a fifth rotatable connection;
a third portion connectable to the first portion and the second portion, the third portion includes a sixth rotatable connection and a seventh rotatable connection, and
where the first portion is rotatably connected to the second portion and configured to be rotatable between the first toothed surface and the second toothed surface,
where the first toothed surface and the second toothed surface are configured to engage,
where the fourth rotatable connection is connected to the seventh rotatable connection,
where the fifth rotatable connection is connected to the sixth rotatable connection, and
where the third portion is configured to connect the first portion to the second portion.

23 Claims, 11 Drawing Sheets

LINKAGE FOR A VEHICLE SUSPENSION

CROSS-REFERENCE TO RELATED APPLICATIONS

This application is a continuation-in-part of U.S. application Ser. No. 12/217,253, filed Jul. 3, 2008 now U.S. Pat. No. 7,954,834. The entirety of the aforementioned application is herein incorporated by reference.

BACKGROUND OF THE INVENTION

Generally, the present invention relates to a vehicle. More particularly, the present invention relates to a vehicle with suspension. Vehicles with suspension typically require suspension links to connect a vehicles frame to unsprung mass components of the vehicle.

SUMMARY OF THE INVENTION

According to an embodiment of the present invention, a linkage for connecting a frame of a vehicle to an unsprung mass component of the vehicle, comprises, a first portion connectable to the frame, the first portion comprises a first toothed surface and a fourth rotatable connection, and a second portion connectable to the unsprung mass component, the second portion comprises a second toothed surface and a fifth rotatable connection, and a third portion connectable to the first portion and the second portion, the third portion comprises a sixth rotatable connection and a seventh rotatable connection. The first portion is rotatably connected to the second portion and configured to be rotatable between the first toothed surface and the second toothed surface, and the first toothed surface and the second toothed surface are configured to engage. The fourth rotatable connection is connected to the seventh rotatable connection, the fifth rotatable connection is connected to the sixth rotatable connection, and the third portion is configured to connect the first portion to the second portion.

In one aspect, the first portion comprises a first rigid connection to the frame. In one aspect, the first portion comprises a first rotatable connection to the frame, the first rotatable connection comprises one first rotational axis. In one aspect, the first rotational axis is substantially perpendicular to a horizontal plane of the vehicle. In one aspect, the first rotatable connection comprises a bearing. In one aspect, the second portion comprises a second rigid connection to the unsprung mass component. In one aspect, the second portion comprises a second rotatable connection to the unsprung mass component.

In one aspect, the second rotatable connection comprises one second rotational axis. In one aspect, the second rotational axis is substantially parallel to the horizontal plane of the vehicle. In one aspect, the second rotatable connection comprises a bearing. In one aspect, the second portion comprises a third rotatable connection, the third rotatable connection comprises a plurality of fourth rotational axis. In one aspect, the third rotatable connection comprises a bearing. In one aspect, the first toothed surface comprises at least one tooth and the second toothed surface comprises at least two teeth.

In one aspect, the second toothed surface comprises at least one tooth and the first toothed surface comprises at least two teeth. In one aspect, the first toothed surface comprises a gear tooth profile. In one aspect, the second toothed surface comprises the gear tooth profile. In one aspect, the first portion is rotatably connected to the second portion about a third rotational axis between the first toothed surface and the second toothed surface. In one aspect, the third rotational axis is substantially parallel to the horizontal plane of the vehicle. In one aspect, the first toothed surface comprises a first circular toothed profile and a fifth rotational axis, the fifth rotational axis located at the center of the first circular toothed profile and at the center of the fourth rotatable connection. In one aspect, the second toothed surface comprises a second circular toothed profile and a sixth rotational axis, the sixth rotational axis located at the center of the second circular toothed profile and at the center of the fifth rotatable connection. In one aspect, the fourth rotatable connection, the fifth rotatable connection, the sixth rotatable connection, and the seventh rotatable connection, may comprise a bearing.

In another embodiment, a vehicle suspension system comprises a vehicle further comprising a frame, an unsprung mass component, and the linkage. The linkage is connected between the frame and the unsprung mass component of the vehicle.

In another embodiment, a method of using a linkage comprises the vehicle, the vehicle comprises the frame and the unsprung mass component, providing the linkage, connecting the first portion to the frame, and connecting the second portion to the unsprung mass component.

In another embodiment, the method comprises a machine readable substrate configured to cause a machine to execute a method.

DETAILED DESCRIPTION OF THE PREFERRED EMBODIMENTS

In the following description, the use of "a", "an", or "the" can refer to the plural. All examples given are for clarification only, and are not intended to limit the scope of the invention.

The term "linkage" is used to describe a member which typically connects a vehicles frame to an unsprung mass component of the vehicle. "Linkage" may also refer to components of a vehicle such as an a-arm, a control arm, a radius rod, a panhard rod, trailing arm, swing arm, and truck arm but not limited to these.

In a land vehicle with a suspension, such as an automobile, a motorcycle, or a bicycle, "unsprung mass component" may also refer to components of the vehicle such as a wheel, a wheel carrier, an axle, a spindle, a strut and a hub but not limited to these.

An advantage to the embodiments shown is that the suspension link may have a variable pivot location in effect at the vehicle frame connection and may also have a variable pivot location in effect at the unsprung mass component connection.

It is understood that any ordinary person skilled in the art understands that the pivot locations of a member which connects a vehicles frame to its unsprung mass components influences a vehicles roll and pitch characteristics of a four wheeled vehicle and pitch characteristics of a two wheeled vehicle.

Figure 1A:
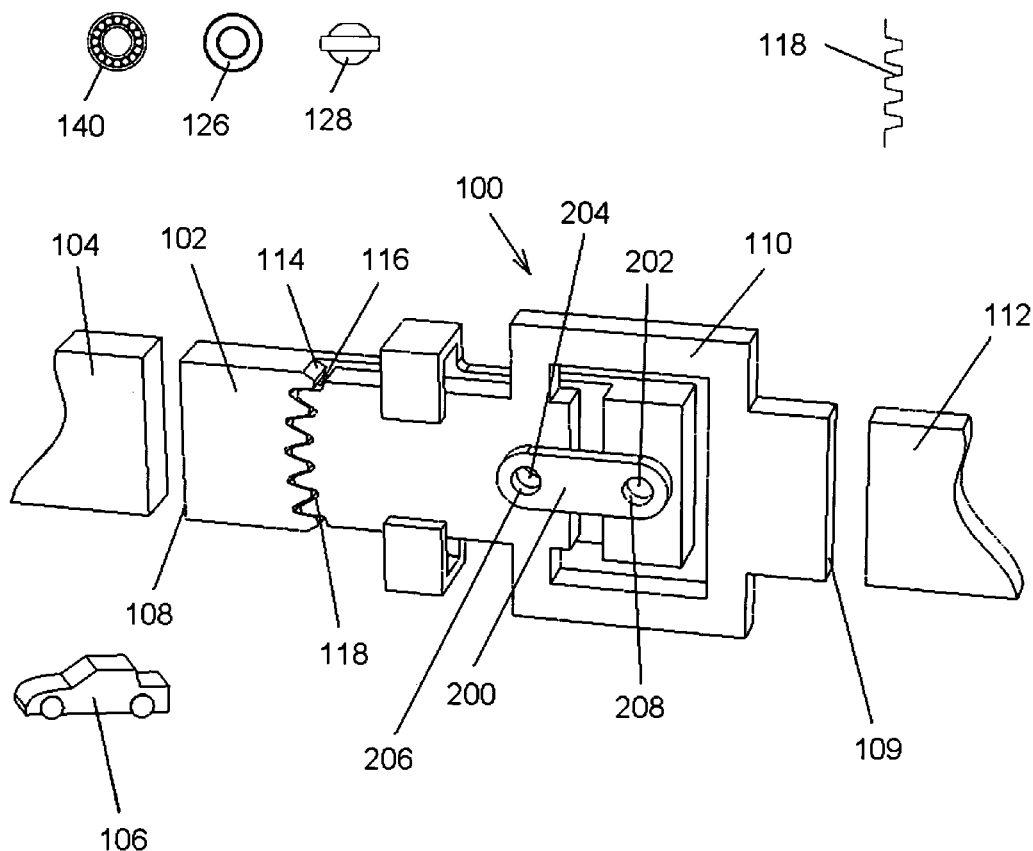
FIG. 1A shows a perspective view of the linkage according to a preferred embodiment.
Figure 1B:
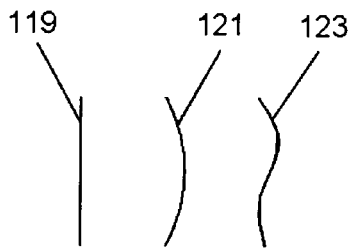
FIG. 1B shows a side view of toothed profiles of the linkage according to a preferred embodiment.
Figure 1C:
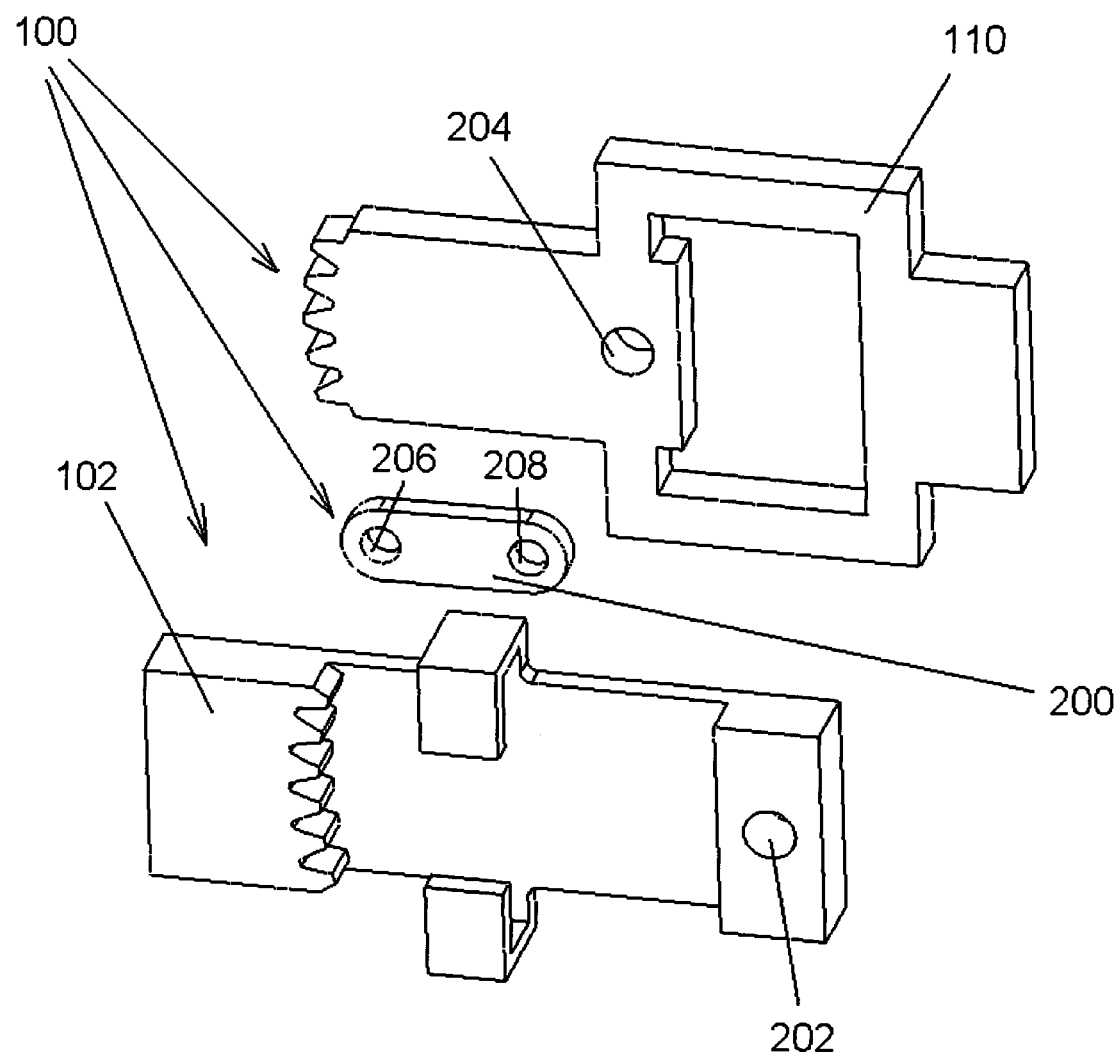
FIG. 1C shows a perspective exploded view of the linkage shown in FIG. 1A.

Referring to FIG. 1A and FIG. 1B, according to an embodiment, a linkage 100 includes a first portion 102 which is connectable to a frame 104 of a vehicle 106. The first portion 102 may be connected to the frame 104 with a first rigid connection 108. The linkage 100 further includes a second portion 110 which is connectable to an unsprung mass component 112 of the vehicle 106. The second portion 110 may be connected to the unsprung mass component 112 of the vehicle 106 with a second rigid connection 109. The first portion 102 includes a first toothed surface 114. The second portion 110 includes a second toothed surface 116. The first portion 102 is rotatably connected to the second portion 110 between the first toothed surface 114 and the second toothed surface 116. The first toothed surface 114 and the second toothed surface 116 may comprise a gear tooth profile 118 capable of meshing with each other. The first toothed surface 114 and the second toothed surface 116 are not limited to the gear tooth profile 118 as other profiles capable of meshing may be used. The first toothed surface 114 and second toothed surface 116 may include profiles shown in FIG. 1B. These profiles are shown without teeth for simplicity purposes and may include a straight gear tooth profile 119, a curved gear tooth profile 121, and a multiple curved gear tooth profile 123. The first portion 102 further includes a fourth rotatable connection 202. The second portion 110 further includes a fifth rotatable connection 204. The linkage 100 further includes a third portion 200 which is connectable to the first portion 102 and the second portion 110. The third portion 200 further includes a sixth rotatable connection 206 and a seventh rotatable connection 208. The fourth rotatable connection 202 is connected to the seventh rotatable connection 208. The fifth rotatable connection 204 is connected to the sixth rotatable connection 206. The sixth rotatable connection 206 and the seventh rotatable connection 208 may include a bearing 140. Bearing types which may be used that are known in the art may include a spherical bearing 128, and a resilient bearing 126 but not limited to these. The third portion 200 is configured to connect the first portion 102 to the second portion 110 and engage the first toothed surface 114 to the second toothed surface 116. Referring now to FIG. 1C, the linkage 100 is shown where the first portion 102, the second portion 110 and the third portion 200 are separated. The third portion 200 includes a sixth rotatable connection 206 and a seventh rotatable connection 208. The first portion 102 further includes a fourth rotatable connection 202. The second portion 110 further includes a fifth rotatable connection 204.

Figure 2:
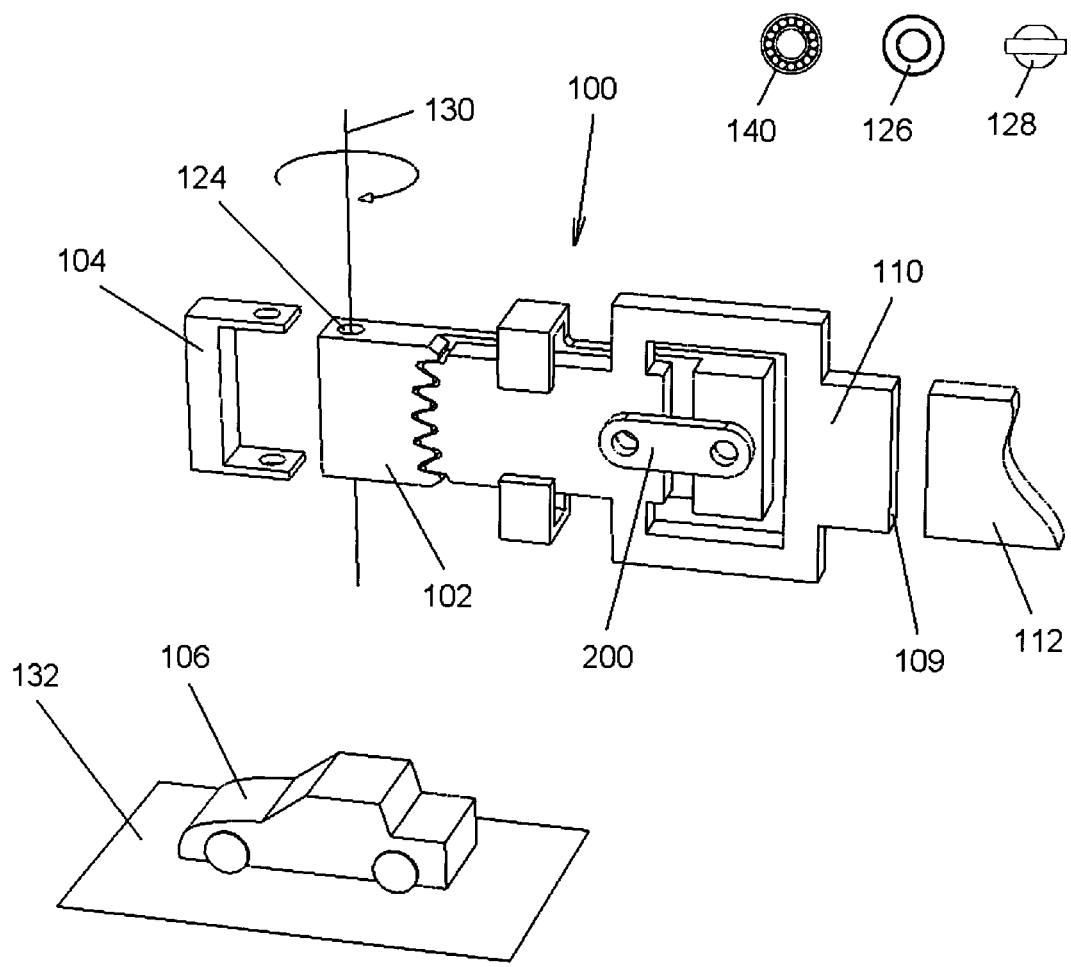
FIG. 2 shows a perspective view of the linkage according to a preferred embodiment.

Referring now to FIG. 2, according to an embodiment, the first portion 102 of the linkage 100 includes a first rotatable connection 124 which rotatably connects the first portion 102 to the frame 104. Rotatable connections known in the art may be used such as a bearing 140 but not limited to these. Bearing types which may be used that are known in the art may include a spherical bearing 128, and a resilient bearing 126 but not limited to these. The first rotatable connection 124 includes one axis which is a first rotational axis 130. The first rotational axis 130 is substantially perpendicular to a horizontal plane 132 of the vehicle 106. A benefit of a first rotatable connection 124 at the frame 104 is to allow additional movement of the linkage 100 when operating in certain suspension systems. Historically for example, a lower trailing arm in a four wheeled vehicle three point rear suspension system with a panhard bar requires the lower trailing arm to have more than one rotational axis at the frame connection. A one axis only pivot connection would bind the system as the suspension traveled, particularly due to the panhard bar slightly shifting the rear end sideways during travel. The spherical bearing 128 is typically used in this system which adds additional movement. This is known to those in the art. The second portion 110 of the linkage 100 includes a second rigid connection 109 to an unsprung mass component 112. The third portion 200 is connectable to the first portion 102 and the second portion 110.

Figure 3:
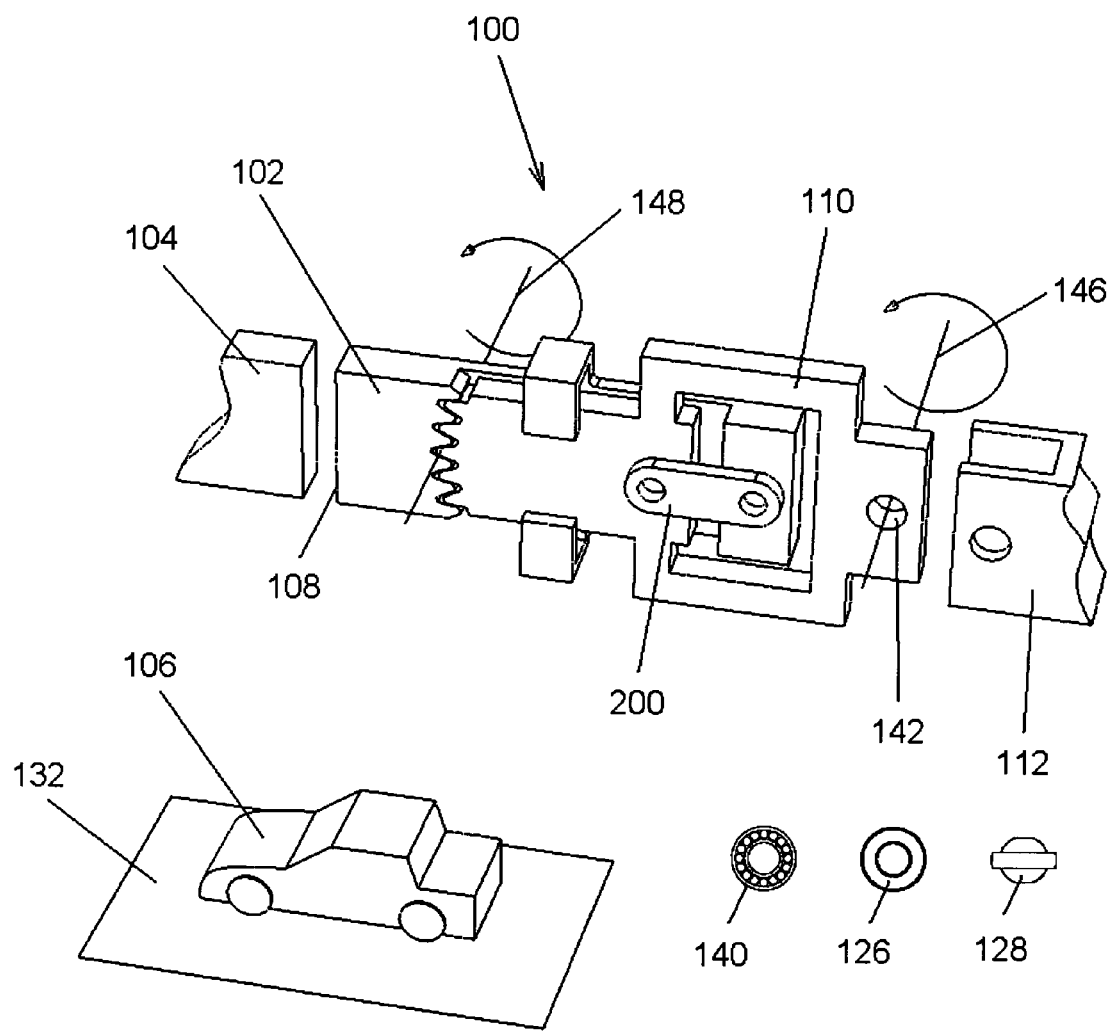
FIG. 3 shows a perspective view of the linkage according to a preferred embodiment.

Referring now to FIG. 3, according to an embodiment, the second portion 110 of the linkage 100 includes a second rotatable connection 142 which rotatably connects the second portion 110 to the unsprung mass component 112. The second rotatable connection 142 may include a bearing 140. Bearing types which may be used that are known in the art may include a spherical bearing 128, and a resilient bearing 126 but not limited to these. The second rotatable connection 142 includes one second rotational axis 146. The second rotational axis 146 is substantially parallel to the horizontal plane 132 of the vehicle 106. An example that would benefit from the second rotational connection 142 having one second rotational axis 146 rotatably connecting the unsprung mass component 112 would be in a rear suspension system of a motorcycle where its trailing arm connects to its rear wheel. A third rotational axis 148 is also shown. The third rotational axis 148 passes through a point of contact between the gear teeth. The point of contact is considered the instantaneous center of rotation. The first portion 102 is capable of rotating in respect to the second portion 110 about the third rotational axis 148. The third rotational axis 148 is substantially parallel to the horizontal plane 132 of the vehicle 106 and is capable of moving during suspension travel when used in a suspension system. The first portion 102 of the linkage 100 includes the first rigid connection 108 to the frame 104. The third portion 200 is connectable to the first portion 102 and the second portion 110.

Figure 4:
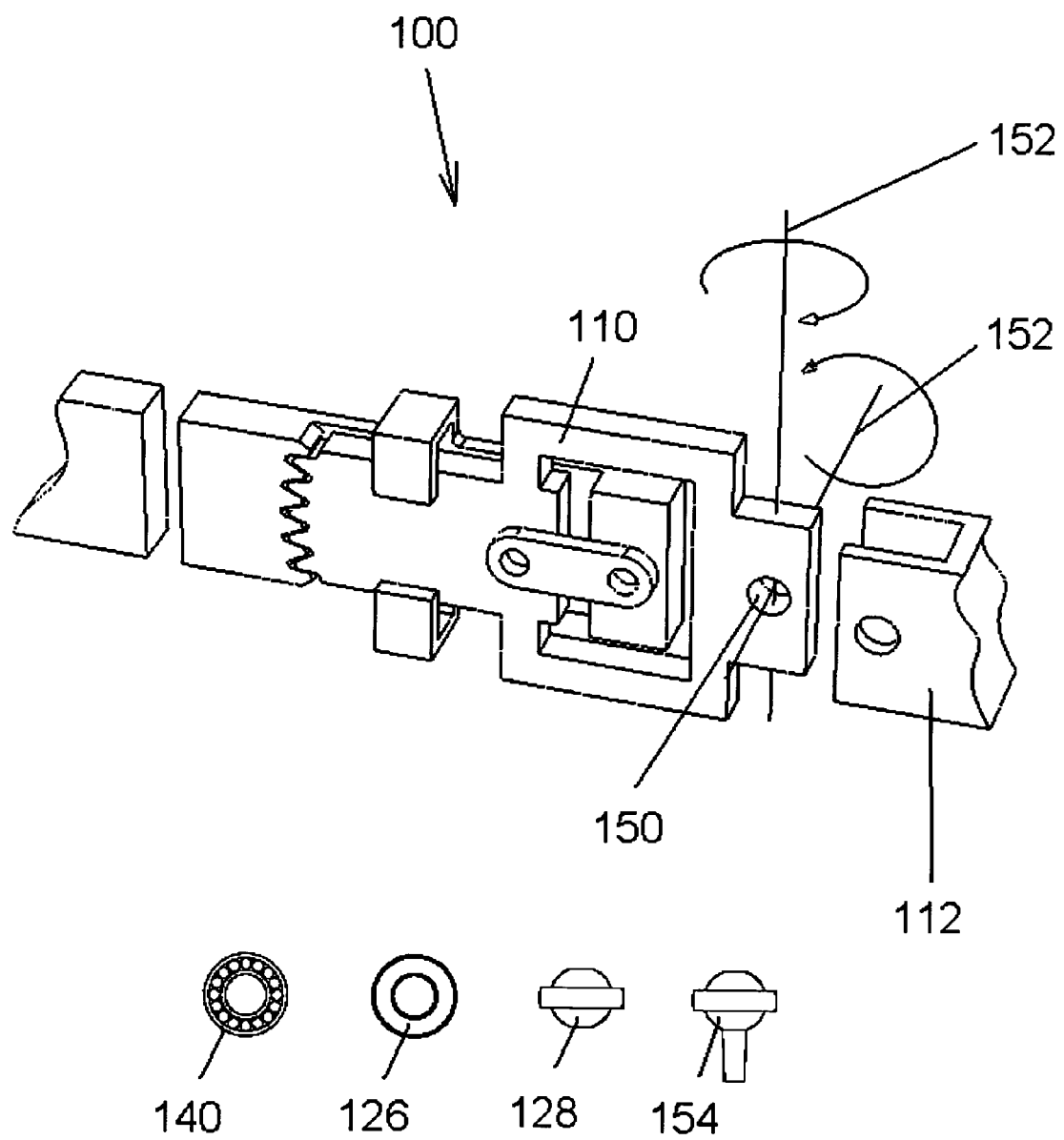
FIG. 4 shows a perspective view of the linkage according to a preferred embodiment.

Referring now to FIG. 4, according to an embodiment, the second portion 110 of the linkage 100 includes a third rotatable connection 150 which rotatably connects the second portion 110 to an unsprung mass component 112. This third rotatable connection 150 includes a plurality of fourth rotational axis 152.

Rotatable connections with a plurality of rotational axis known in the art may be used such as a bearing 140.

Bearing types which may be used that are known in the art may also include a spherical bearing 128, a resilient bearing 126, and a ball joint 154 but not limited to these. An example of where a rotatable connection having a plurality of axes may be used is in a double wishbone front suspension system of a four wheel vehicle. Upper and lower control arms are typically connected to a spindle. It is necessary for this connection to have a plurality of rotational axis to allow for suspension travel and for the rotation of the spindle for steering of the vehicle.

Figure 5A:
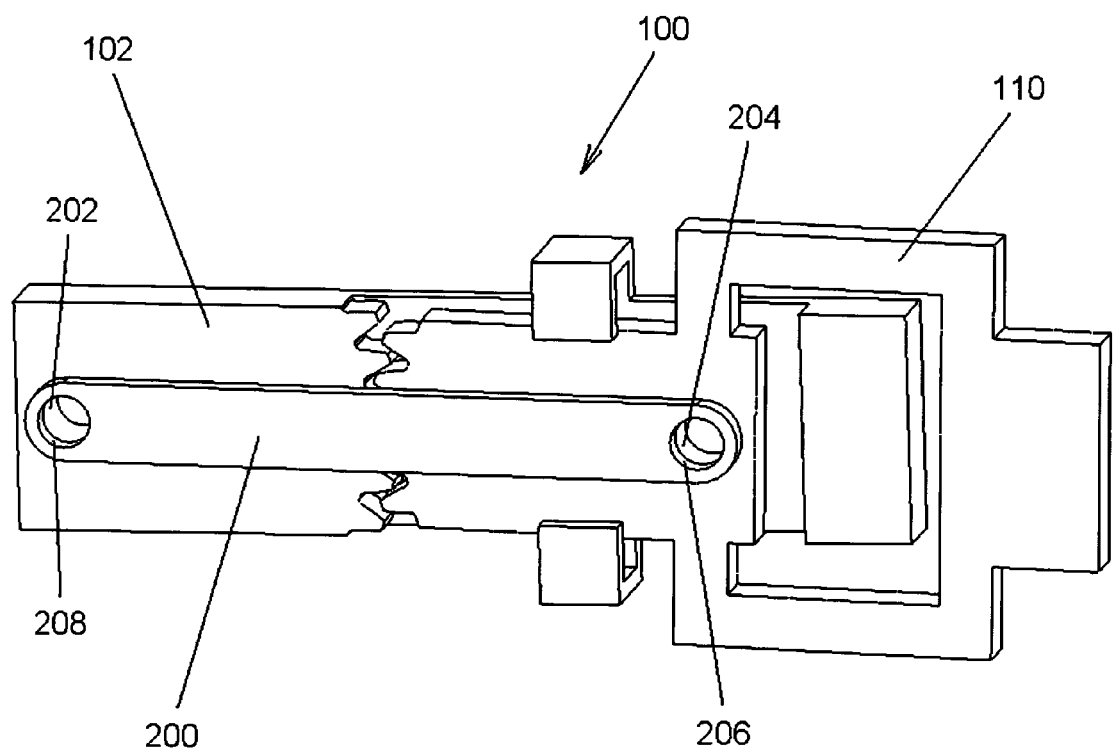
FIG. 5A shows a perspective view of the linkage according to a preferred embodiment.
Figure 5B:
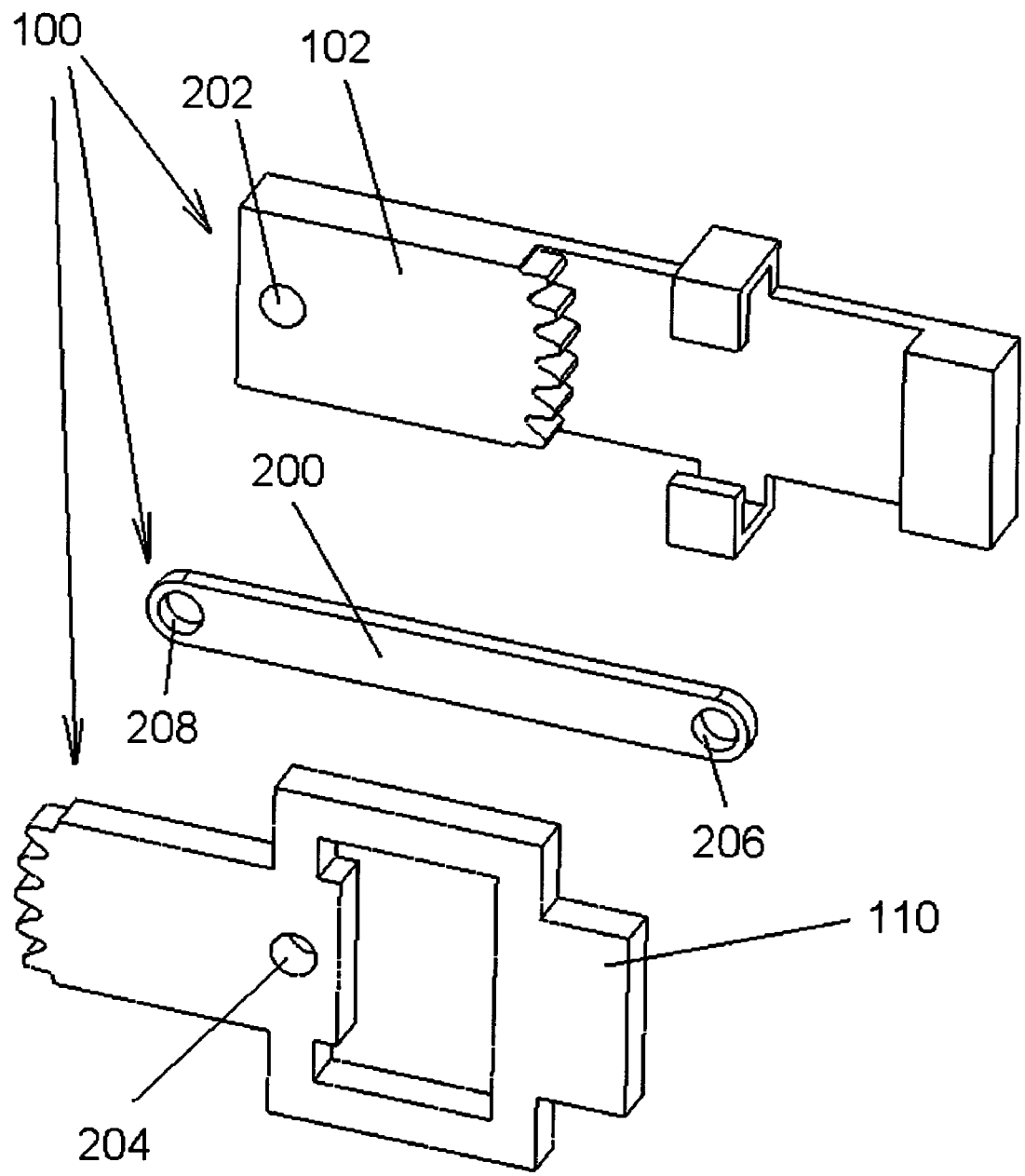
FIG. 5B shows a perspective exploded view of the linkage as shown in FIG. 5A.

Referring now to FIGS. 5A and 5B, according to an embodiment, the linkage 100 includes a first portion 102, a second portion 110, and a third portion 200 connectable to the first portion 102 and to the second portion 110. The first portion 102 includes a fourth rotatable connection 202. The second portion 110 includes a fifth rotatable connection 204. The third portion 200 includes a sixth rotatable connection 206 and a seventh rotatable connection 208. The fourth rotatable connection 202 is connected to the seventh rotatable connection 208. The fifth rotatable connection 204 is connected to the sixth rotatable connection 206. The sixth rotatable connection 206 and the seventh rotatable connection 208 may include a bearing 140. Bearing types which may be used that are known in the art may include a spherical bearing 128, and a resilient bearing 126 but not limited to these. The third portion 200 is configured to connect the first portion 102 to the second portion 110 and engage the first toothed surface 114 to the second toothed surface 116.

Figure 6:
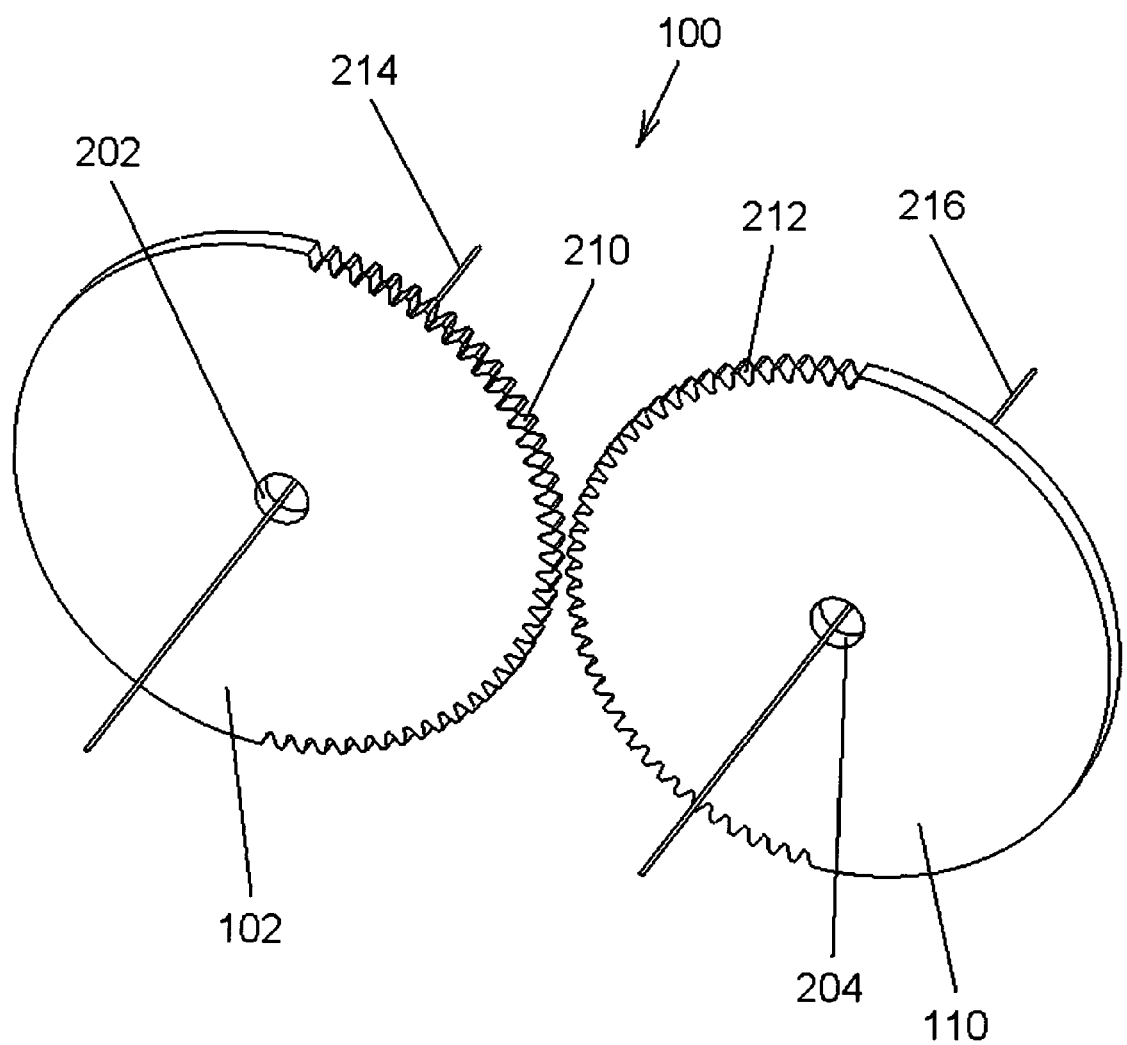
FIG. 6 shows a perspective view of the linkage according to a preferred embodiment.

Referring now to FIG. 6, according to an embodiment, the first portion 102 of the linkage 100 includes a fifth rotational axis 214 and the second portion 110 includes a sixth rotational axis 216. The fifth rotational axis 214 is located in the center of the first circular toothed profile 210 and in the center of the fourth rotatable connection 202. The sixth rotational axis 216 is located in the center of the second circular toothed profile 212 and in the center of the fifth rotatable connection 204.

Figure 7A:
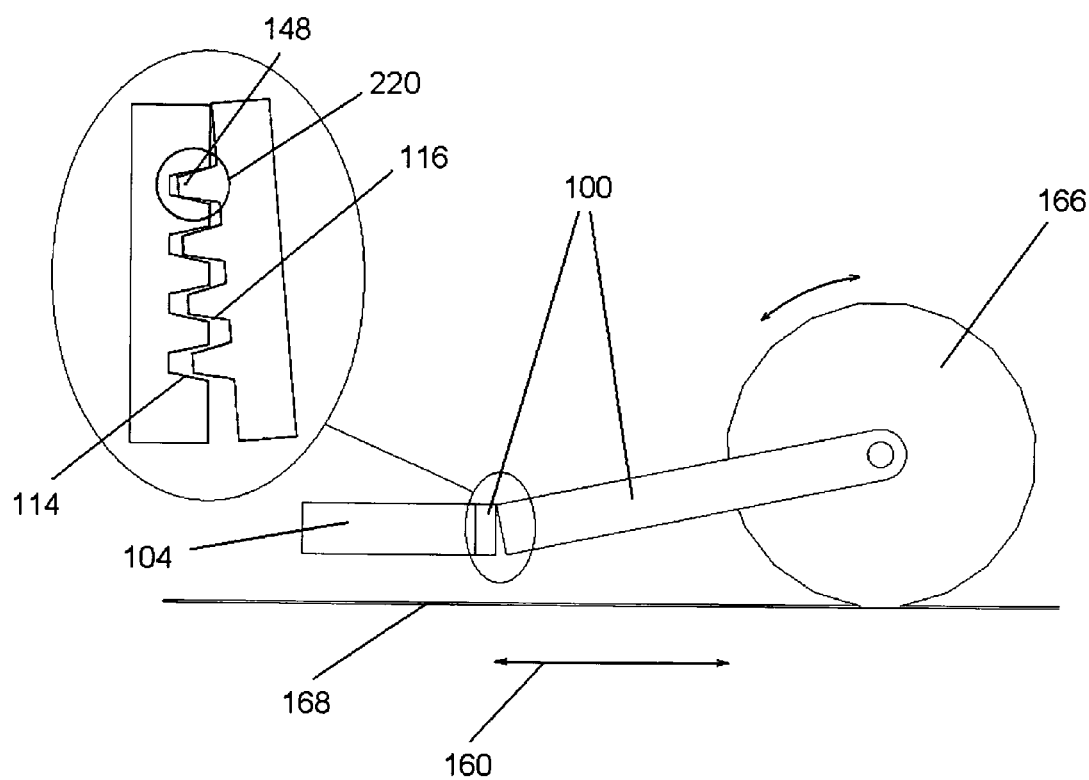
FIG. 7A shows a side view of the linkage in a vehicle suspension system.
Figure 7B:
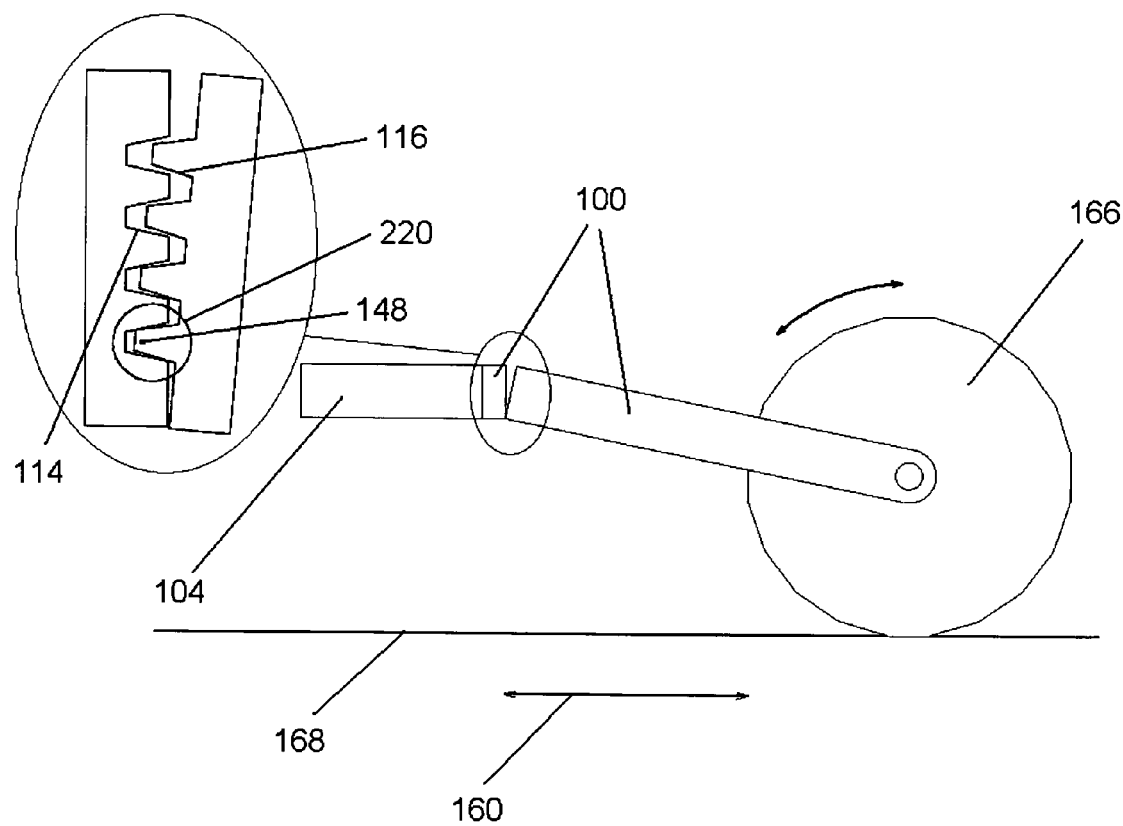
FIG. 7B shows a side view of the linkage in a vehicle suspension system.

Referring now to FIG. 7A and FIG. 7B, a linkage 100 is shown in a vehicle suspension system which includes the frame 104 and a wheel 166 which is rotatably mounted to the linkage 100. The linkage 100 is rigidly attached to the frame 104. FIG. 7A shows a general position of a first instantaneous contact point 220 which is the location where the third rotational axis 148 passes through and FIG. 7B shows another general position of the first instantaneous contact point 220 which is the location where the third rotational axis 148 passes through. The first instantaneous contact point 220 is movable during suspension travel and is the area in which the first toothed surface 114 makes contact with the second toothed surface 116. This area is also the area in which a direction of force 160 may transfer between the first toothed surface 114 and the second toothed surface 116. Some of the forces may come from acceleration, braking, and lateral forces but not limited to these. The first instantaneous contact point 220 may also be configured to decouple by a direction of force 160. This may be accomplished with backlash between the first toothed surface 114 and the second toothed surface 116. In FIG. 7A, the frame 104 is shown in one position relative to the ground surface 168 and FIG. 7B shows another position of the frame 104 relative to the ground surface 168. This position moves during suspension travel.

Figure 8:
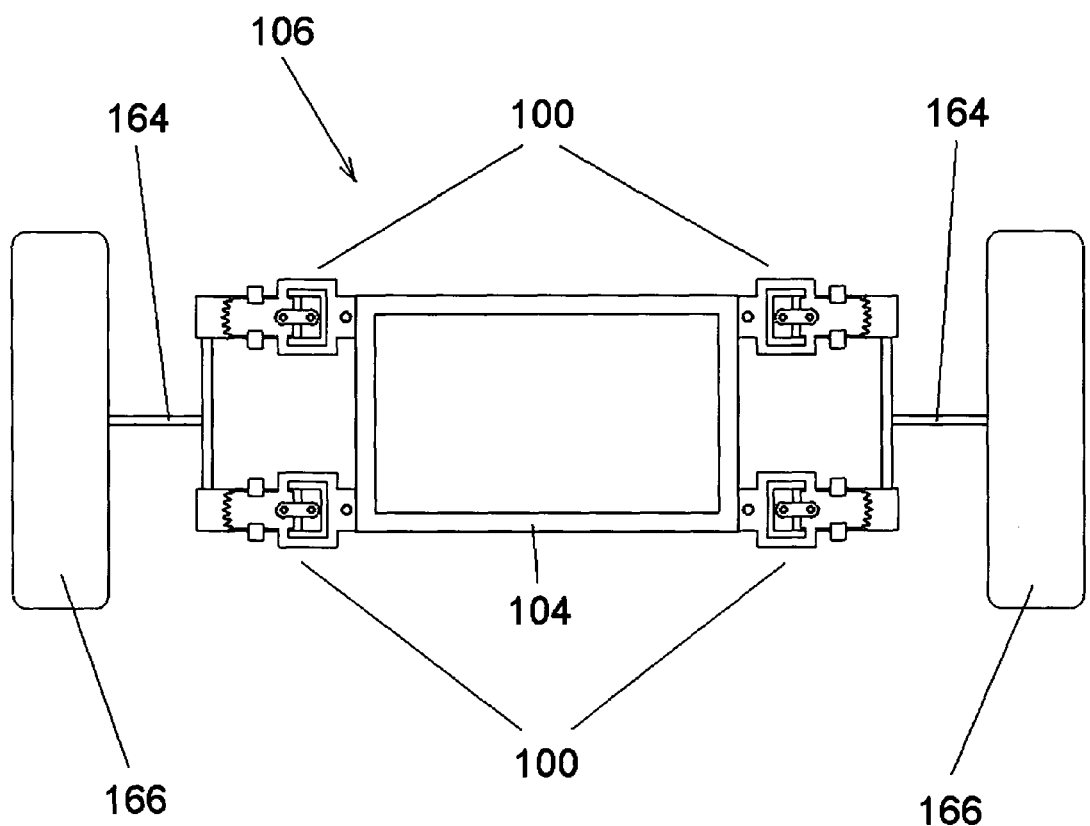
FIG. 8 shows a front view of a double wishbone suspension system employing the linkage described herein.

Referring now to FIG. 8, according to an embodiment, a vehicle suspension system includes a linkage 100 connected to a frame 104 of a vehicle 106, a spindle 164 connected to the linkage 100, and a wheel 166 rotatably connected to the spindle 164 but not limited to these.

Of course, the various aspects of the embodiments shown in FIGS. 1-8 may be mixed and matched as desired, where possible. Further, the present invention is not limited to only those embodiments shown.

I claim:

1. A linkage for connecting a frame of a vehicle to an unsprung mass component of said vehicle, comprising:
   a first portion connectable to said frame, said first portion comprising a first toothed surface and a fourth rotatable connection; and
   a second portion connectable to said unsprung mass component, said second portion comprising a second toothed surface and a fifth rotatable connection; and
   a third portion connectable to said first portion and said second portion, said third portion comprising a sixth rotatable connection and a seventh rotatable connection, and
   wherein said first portion is rotatably connected to said second portion and configured to be rotatable between said first toothed surface and said second toothed surface,
   wherein said first toothed surface and said second toothed surface are configured to engage,
   wherein said fourth rotatable connection is connected to said seventh rotatable connection, wherein said fifth rotatable connection is connected to said sixth rotatable connection, and wherein said third portion is configured to connect said first portion to said second portion.

2. The linkage as claimed in claim 1, wherein said first portion comprises a first rigid connection to said frame.

3. The linkage as claimed in claim 1, wherein said first toothed surface comprises a gear tooth profile.

4. The linkage as claimed in claim 1, wherein said second toothed surface comprises said gear tooth profile.

5. The linkage as claimed in claim 1, wherein said first portion is rotatably connected to said second portion about a third rotational axis between said first toothed surface and said second toothed surface.

6. The linkage as claimed in claim 1, wherein said first portion comprises a first rotatable connection to said frame, said first rotatable connection comprising one first rotational axis.

7. The linkage as claimed in claim 5, wherein said third rotational axis is substantially parallel to said horizontal plane of said vehicle.

8. The linkage as claimed in claim 1, wherein said second toothed surface comprises a second circular toothed profile and a sixth rotational axis, said sixth rotational axis located at the center of said second circular toothed profile and at the center of said fifth rotatable connection.

9. The linkage as claimed in claim 1, wherein said fourth rotatable connection, said fifth rotatable connection, said sixth rotatable connection, and said seventh rotatable connection, may comprise a bearing.

10. The linkage as claimed in claim 1, wherein said first toothed surface comprises a first circular toothed profile and a fifth rotational axis, said fifth rotational axis located at the center of said first circular toothed profile and at the center of said fourth rotatable connection.

11. The linkage as claimed in claim 1, wherein said second portion comprises a third rotatable connection, said third rotatable connection comprising a plurality of fourth rotational axis.

12. The linkage as claimed in claim 11, wherein said third rotatable connection comprises a bearing.

13. The linkage as claimed in claim 6, wherein said first rotational axis is substantially perpendicular to a horizontal plane of said vehicle.

14. The linkage as claimed in claim 6, wherein said first rotatable connection comprises a bearing.

15. The linkage as claimed in claim 1, wherein said second portion comprises a second rigid connection to said unsprung mass component.

16. The linkage as claimed in claim 1, wherein said second portion comprises a second rotatable connection to said unsprung mass component.

17. The linkage as claimed in claim 1, wherein said first toothed surface comprises at least one tooth and said second toothed surface comprises at least two teeth.

18. The linkage as claimed in claim 1, wherein said second toothed surface comprises at least one tooth and said first toothed surface comprises at least two teeth.

19. The linkage as claimed in claim 16, wherein said second rotatable connection comprises one second rotational axis.

20. The linkage as claimed in claim 19, wherein said second rotational axis is substantially parallel to said horizontal plane of said vehicle.

21. The linkage as claimed in claim 16, wherein said second rotatable connection comprises a bearing.

22. A vehicle suspension system comprising:
a vehicle further comprising a frame;
an unsprung mass component;
and said linkage as claimed in claim 1;
wherein said linkage is connected between said frame and said unsprung mass component of said vehicle.

23. A method of using a linkage, comprising:
providing a vehicle, the vehicle comprising a frame and an unsprung mass component;
providing the linkage as claimed in claim 1;
connecting the first portion to the frame; and
connecting the second portion to the unsprung mass component.

* * * * *